United States Patent [19]

Stanley

[11] 4,301,693

[45] Nov. 24, 1981

[54] HAND BRAKE FOR RAILROAD CARS

[76] Inventor: Richard B. Stanley, 520 Shorely Dr., Barrington, Ill. 60010

[21] Appl. No.: 895,617

[22] Filed: Apr. 12, 1978

[51] Int. Cl.³ .......................... G05G 1/08; F16H 1/28; B66D 1/22
[52] U.S. Cl. ......................................... 74/505; 74/801
[58] Field of Search ................. 74/505, 506, 507, 801; 254/149

[56] References Cited

U.S. PATENT DOCUMENTS

| 276,776 | 5/1883 | Clemons | 254/171 |
|---|---|---|---|
| 301,096 | 7/1884 | Clemons | 74/804 |
| 1,366,676 | 1/1921 | O'Connor | 74/804 |
| 1,766,273 | 6/1930 | Wine | 74/505 |
| 1,993,977 | 3/1935 | O'Connor | 74/505 |
| 2,282,736 | 5/1942 | Mersereau | 74/505 |
| 3,640,150 | 2/1972 | Leiner et al. | 74/801 |
| 3,826,154 | 7/1974 | Motus et al. | 74/505 |
| 3,998,430 | 12/1976 | Weseloh | 254/149 |

OTHER PUBLICATIONS

Product Engineering, John H. Glover, "Planetary Gear Systems", Jan. 6, 1964, pp. 59, 60.

Primary Examiner—Kenneth Dorner
Attorney, Agent, or Firm—McWilliams, Mann & Zummer

[57] ABSTRACT

A hand brake for railroad cars comprising a winding drum journaled within its housing to be in concentric relation with the hand brake operating shaft. A brake chain wind up and let out control mechanism is interposed between the brake drum and the operating shaft, with the winding drum being journaled between a pair of annular bearing plates that are concentric with the shaft and fixed to the housing in spaced apart relation to receive the winding drum. The shaft is coupled to the winding drum by a sun and planetary gear reducer mechanism in which a plurality of planetary gear assemblies are mounted on one or more circular lands concentric with the operating shaft for free rolling non-journaled orbiting movement about the sun gear that is keyed to the operating shaft for rotation by same to effect wind up and let up of the brake chain. The sun and planetary gear mechanism has its parts oriented to provide a central drive input and output with balanced internal force applying and resisting characteristics. Brake chain take up and let out is effected by the operator manually operating the operating shaft, and no separate brake chain release mechanism is need or provided for.

17 Claims, 14 Drawing Figures

HAND BRAKE FOR RAILROAD CARS

This application discloses a specific application of and improvements in the planetary gear type gear reducer disclosed in my copending and now abandoned application Ser. No. 881,619, filed Feb. 27, 1978.

This invention relates to a hand brake for railroad cars, and more particularly to the familiar brake rigging hand operated actuating mechanisms with which railroad cars are equipped to apply the car brakes manually, as distinguished from automatic air operation.

Conventional hand brake arrangements generally comprise a housed winding drum actuated for brake application purposes by an operating shaft equipped with the familiar hand wheel or other shaft turning implement. The brake drum is rotated through gearing and clutching that provides for wind up of the brake chain to apply the car brakes, controlled release of the brake chain under the control of the operator, and full release of the brake chain, whereby the brake drum is free to freely unwind under the forces acting on same through the brake chain. The journaling, gearing, and releasable clutching involved in such devices necessarily complicates design and application of such devices.

Furthermore, the recent trend toward requiring hand brake forces suitable for high power applications have presented troublesome stressing problems that often defy solution.

The result is that hand brakes available to the industry are expensive to manufacture, cumbersome to install and maintain, and inordinately difficult and troublesome to operate.

My studies of hand brakes show that conventional models operate at an efficiency of around 60 percent. It is assumed for testing purposes a force of 125 pounds will be needed to turn the hand wheel. Further, vibration and high speed impacts that hand brakes are subject to can cause operational difficulties due at least in part to the complicated nature of conventional hand brake models.

A further and very practical problem in connection with devices of this type has to do with the journaling of the principal components of the device, such as the familiar brake drum, operating shafts, and release shaft. In common prior art models, the brake drum has its own journaling shaft or its equivalent, and the operating and release shafts are separately journaled in the housing in suitable spaced apart relation; since the latches and clutching mechanisms that are also necessarily involved require journaling or other suitable mounting as well, these approaches result in a rather large, complex and heavy mechanism that is expensive to manufacture and all too frequently subject to mechanical difficulties.

While some conventional hand brake models have effected some simplification of parts by journaling the winding drum on or about the operating shaft, this has not materially reduced the complexity, mass, and expense of manufacture of devices of this type due to the nature of the clutches and release mechanisms that have been traditionally employed.

The principal object of this invention is to provide a hand brake arrangement for railroad cars of a balanced simplified design that operates at an efficiency that approaches 90 percent.

Another principal object of the invention is to provide a hand brake arrangement for railroad cars that operates with high leverage while being light of weight and relatively small in size, and effecting brake chain wind up with minimized effort on the operator's part while providing for controlled brake chain let out that does not involve or require full release to accommodate the release of the brakes.

Still another object of the invention is to provide a hand brake arrangement that builds the basic device in a compact manner about the operating shaft as the focal point of the device, and provides a powerful brake chain wind up and let out mechanism that is interposed between the device operating shaft and winding drum and is oriented to be in coaxial relation to the operating shaft.

Another important object of the invention is to provide a hand brake arrangement for railroad cars in which the traditional full release is eliminated as unnecessary and which provides for release of the brake chain under the full control of the operator and with a pay out rate that fully satisfies requirements.

Yet another basic object of the invention is to provide a hand brake arrangement of the sun and planetary gear reducer type that is self locking in nature and provides for full operator control in both brake chain take up and let out.

Other objects of the invention are to provide a center loaded hand brake arrangement embodying a gear reducer mechanism of balanced application and resistance characteristics, to provide a hand brake arrangement that minimizes internal friction drag, while maximizing stress resisting areas for reduced force concentrations, and orienting the parts involved for balanced load application and force resisting characteristics.

Still other objects of the invention are to provide a hand brake arrangement that is of few and simple parts, that is easy to assemble and install, and that is long lived, effective, and trouble free in operation.

In accordance with the present invention, the hand brake arrangement involves the basic hand brake mechanism being built up about the hand brake operating shaft and essentially between the operating shaft and the brake drum which is disposed in concentric relation to and about the operating shaft.

The hand brake housing comprises a pair of substantially identical housing shells of dished configuration joined together about their rims to define a relative flat housing that is open at the bottom to accommodate the brake chain and provided with suitable mounting brackets for applying the mechanism to the car.

Operably associated with the housing shells are a pair of annular bearing plates and associated hub components, with the arrangement being such that at the front and rear of the housing the indicated bearing plates and associated hubs are secured in the housing to journal the operating shaft and wind up drum in the housing. The bearing plates are applied to the housing in spaced apart relation to receive and journal therebetween the winding drum, which is received over the operating shaft in concentric relation thereto while being journaled on the indicated annular bearing plates.

Interposed between the brake drum and the operating shaft is a sun and planetary gear reducer mechanism comprising a sun gear keyed to the operating shaft and disposed within and in coplanar centered relation to the winding drum. The winding drum and bearing plates journaling same are each formed with internal gears that are in meshing relation with a plurality of planetary gear mechanisms interposed between the sun gear and the wind up drum.

In particular accordance with this invention, the hand brake about the operating shaft is provided with circular raceway forming lands about which the planetary gear assemblies ride, in free rolling, non-journaled relation thereto, for their orbiting movement about the sun gear. The lands in accordance with one embodiment of the invention comprise a pair of bearing rings disposed about the shaft and adjacent the respective housing shells and have their peripheral margins provided with the raceway forming lands shaped to define locating internal corners that maintain the planetary gear assemblies centered with respect to the hand brake mechanism involved.

With regard to the gear reducer mechanism itself, in the preferred form the internal gears of the bearing plates that journal the winding drum have equal pitch diameters with an equal number of teeth, while the internal gear of the drum differs in number of teeth from those of the fixed bearing plate gears by one. The planetary gear assemblies each comprise a central gear portion and side gear portions on either side of the central gear portion of which the pitch diameter of the respective side gear portions are equal and also provide an equal number of teeth; the central gear portion differs in number of teeth from those of the side gear portions by one.

An important feature of the gear reducer mechanism involved is that to insure that the gear reducer mechanism is self locking, the pitch diameter of the planetary gear central portion should be about half or less of the pitch diameter of the sun gear; this will not only insure that the gear mechanism is self locking, but will also insure that the gear reducer mechanism involved will rotate the winding drum in the wind up direction at a speed that is at least comparable to the wind up speed of rotation of winding drums of conventional hand brakes. Provision for full release of the hand brake, in the sense that the winding drum is fully free to rotate in the unwinding direction under the tension in the brake chain, is not provided for nor required in the hand brake arrangement of this invention.

Assuming the hand brake is mounted in the operative position normal for devices of this type, wind up of the brake chain to effect setting of the brakes is easy as the device of this invention operates at mechanical efficiency in the range of 80–85 percent. While the force required to rotate the operating shaft utilizing the customary hand wheel will depend on the force on the chain to be achieved, it will be apparent that the operator's strength requirements will obviously be well under what is needed for conventional hand brakes. As the gear reducer mechanism is self locking, it will hold, without latching devices, the brake chain in its fully wound up relation as long as the car is to remain braked by way of the hand brake. Release of the brakes is effected by the operator starting rotation of the hand wheel in the appropriate direction, with the hand brake gear reducer mechanism then operating to unwind the chain under the tensions acting on the chain to the fully unwound relation, the operator controlling the rate of unwinding action, if and as desired, by hand friction or the like on the hand wheel. Complete one hand operation is provided for, with a brake chain force of approximately six thousand pounds or more being made available depending on the application.

Other objects, uses and advantages will be obvious or become apparent from a consideration of the following detailed description and the application drawings in which like reference numerals indicate like parts throughout the several views.

However, it is to be distinctly understood that the specific drawing illustrations provided are supplied primarily to comply with the requirements of the patent Laws, and that the invention is susceptible of other embodiments that will be obvious to those skilled in the art, and which are intended to be covered by the appended claims.

GENERAL DESCRIPTION

Figure 1:
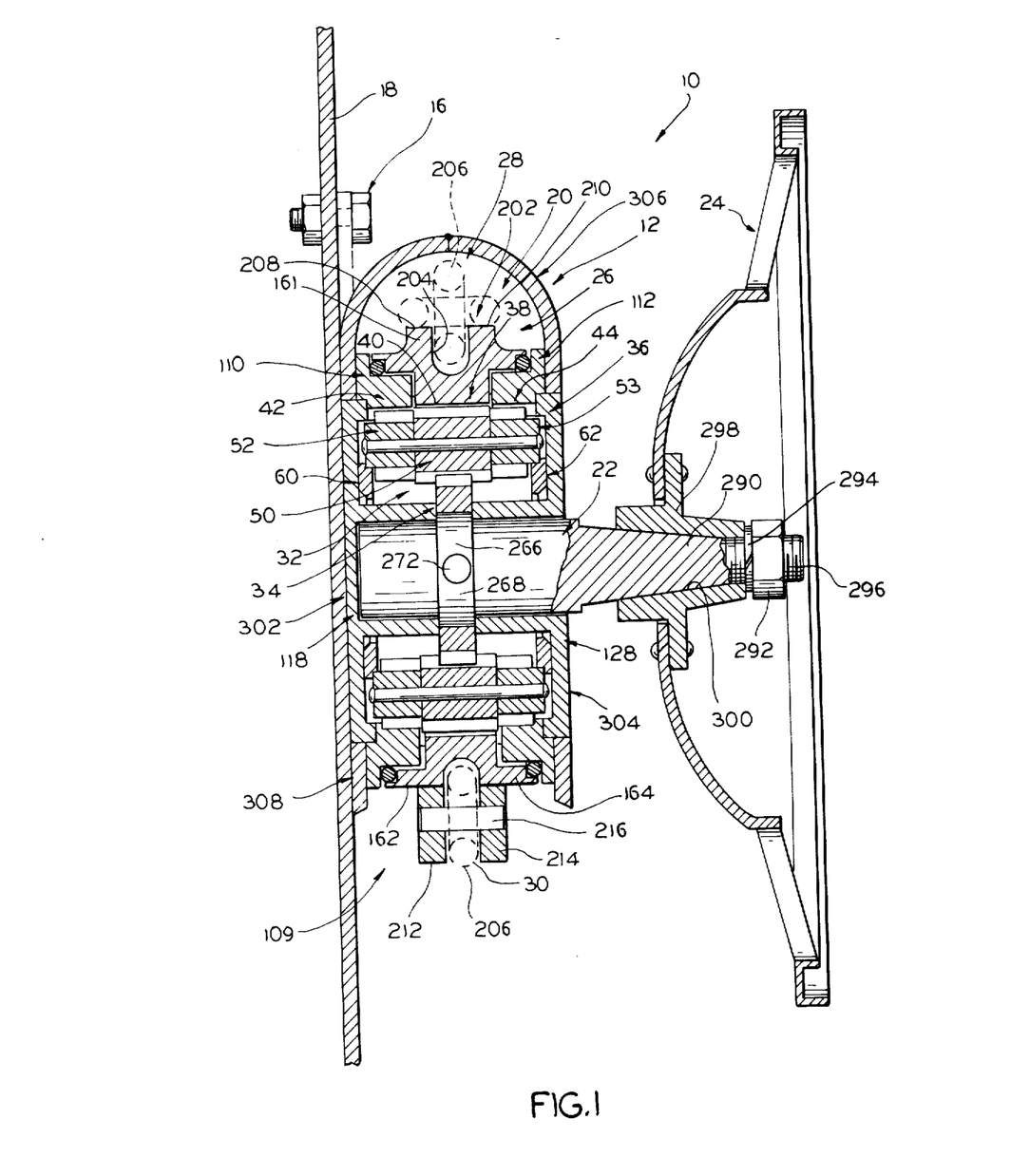
FIG. 1 is a diagrammatic vertical sectional view of the hand brake, taken substantially along line 1—1 of FIG. 6, showing the hand brake as applied to a railroad car, and with the brake chain partially shown in phantom.
Figures 2, 2A, 3:
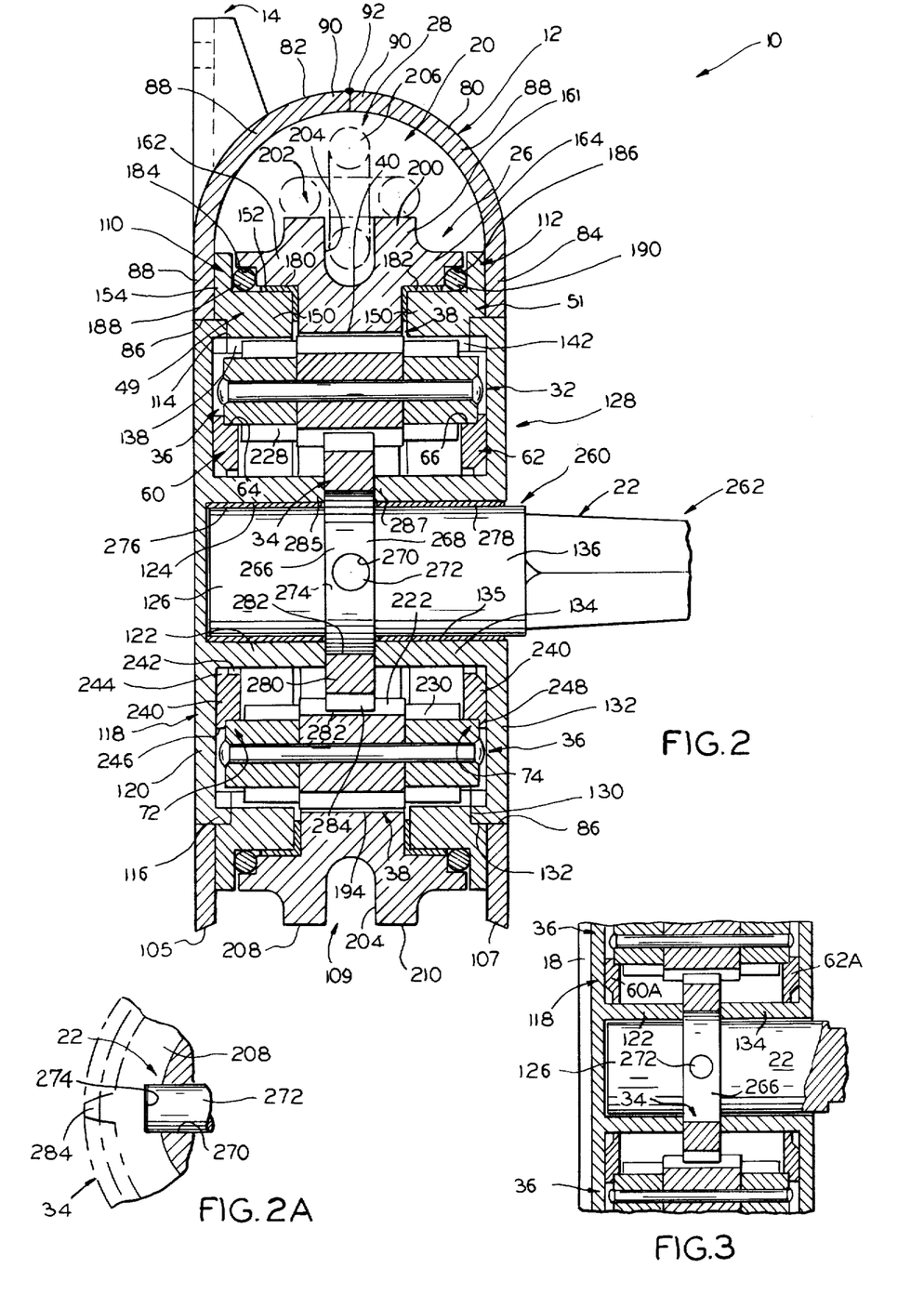
FIG. 2 is a view similar to that of FIG. 1, but on an enlarged scale and restricted to the hand brake mechanism itself.
FIG. 2A is a fragmental view illustrating the manner in which the device sun gear is keyed to the operating shaft.
FIG. 3 is a fragmental sectional view in the area of the hand brake operating shaft, illustrating a modification of the invention.
Figures 6, 7, 7A:
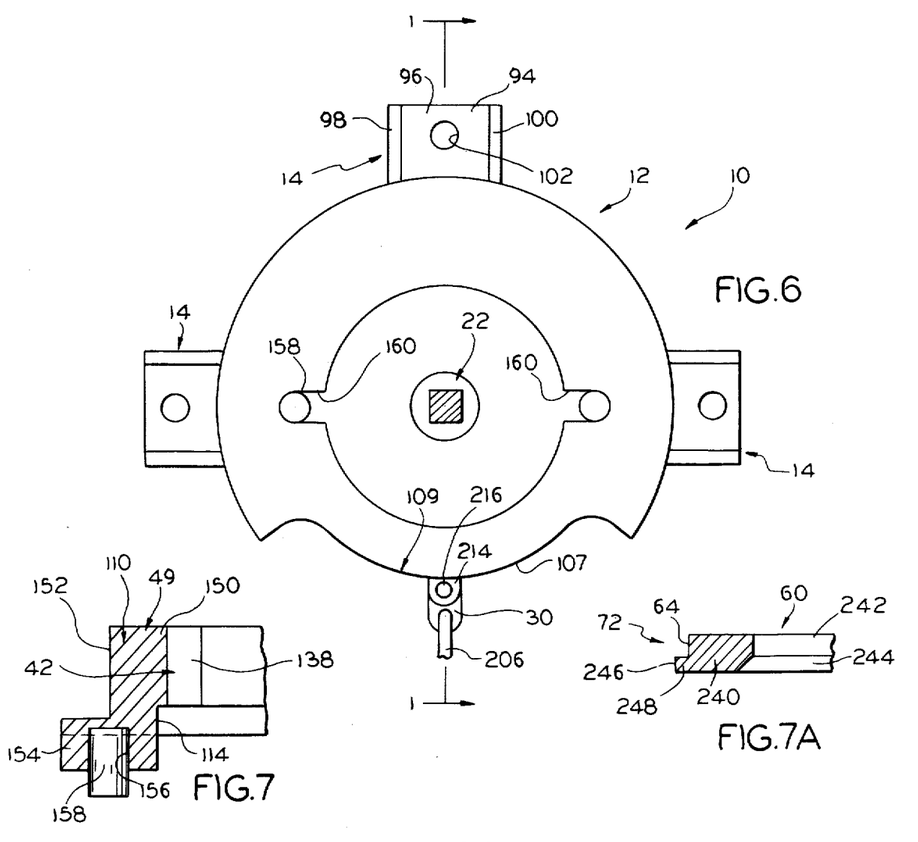
FIG. 6 is a front view of the hand brake with the hand wheel omitted and the operating shaft shown in section.
FIG. 7 is a fragmental sectional view through one of the hand brake bearing plates illustrating a detail of construction.
FIG. 7A is a fragmental sectional view through one of the planetary gear assembly raceway defining rings employed in this invention.

Reference number 10 of FIGS. 1, 2 and 6 generally indicates a preferred hand brake arranged in accordance with this invention, with the hand brake being shown in FIGS. 1 and 6 as it would be applied to a railroad car.

Hand brake mechanism 10 generally comprises housing 12 provided with spaced mounting lugs 14 for fixing the hand brake to the railroad car, as by using suitable bolt and nut assemblies 16, to affix the hand brake 10 to car body plate 18 (that is only diagrammatically illustrated in FIG. 1, but which is intended to represent any conventional car body or frame structure to which hand brakes are conventionally mounted).

Operably mounted within and supported by housing 12 is the hand brake operating mechanism 20 which generally comprises operating shaft 22 journaled in housing 12 and having keyed thereto a conventional hand wheel 24 for rotating the operating shaft 22 to operate the device 10.

Journaled in housing 12 is winding or brake drum 26 to which brake chain 28 has one end 30 suitably anchored thereto, with the other end of the brake chain 28 being connected in the usual manner to the brake rigging for setting the car brakes by utilizing the hand brake 10.

The winding drum 26 in accordance with the present invention is rotated in chain wind up and let out directions through gear reducer mechanism 32 that in accordance with the invention is incorporated between the hand brake operating shaft 22 and the winding drum 26.

The gear reducer mechanism 32 generally comprises sun gear 34 keyed to operating shaft 22 for rotation therewith, a plurality of planetary gear assemblies 36 meshing with sun gear 34 about the sun gear 34, an internal ring gear 38 integral with and formed about the inner margin 40 of the brake drum 26, and a pair of spaced apart fixed internal ring gears 42 and 44 disposed on either side of the winding drum gear 38 that in the illustrated embodiment are part of combination gear and bearing plate structures 49 and 51 that are fixedly mounted in place..

Figure 8:
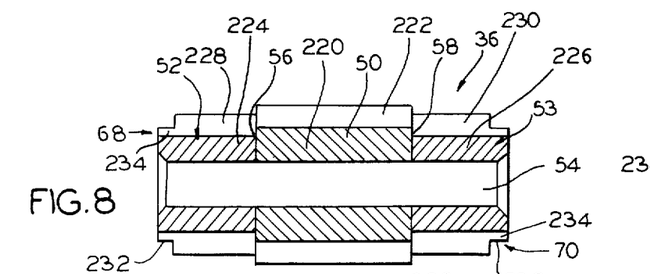
FIG. 8 is a sectional view of one of the planetary gear assemblies employed in connection with the hand brake of this invention, with the section being substantially along the rotating axis of same.
Figure 9:
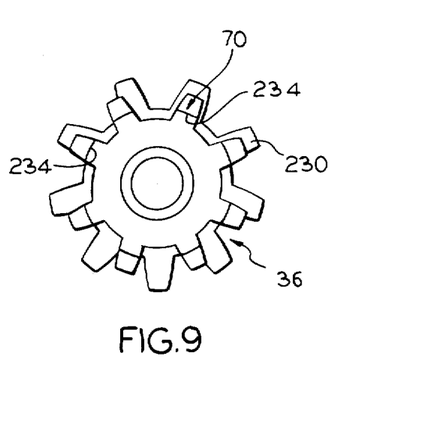
FIG. 9 is a diagrammatic end view of the planetary gear assembly shown in FIG. 6.

The planetary gears 36, as indicated in FIG. 8, each comprise a central portion 50 and side portions 52 and 53 that are secured together in fixed relation in any suitable manner. In the form shown in FIG. 8, these components are fixed together by rivet 54 and are brazed together at their abutting surfaces, as at 56 and 58.

Further in accordance with the invention, the planetary gear assemblies 36 are mounted for free rolling non-journaled orbiting movement about the sun gear 34 by riding engagement with a pair of spaced apart bearing rings 60 and 62. As best shown in FIGS. 2 and 7A, the bearing rings 60 and 62 are formed with the respective circular lands 64 and 66 for this purpose, with the planetary gear assemblies 36 being formed to define the respective rolling surfacings 68 and 70 for rolling engagement with respective land surfaces 64 and 66. The latter form the respective raceways 72 and 74 about which the planetary gear assemblies 36 ride in orbiting about sun gear 34, in accordance with this invention.

In the specific gear reducer mechanism 32 that is illustrated, the side portions 52, 53 of the planetary gear assemblies 36 have equal diameters and equal numbers of teeth, while the central portion 50 has its teeth differ in number from those of the side gear portions 52 and 53 by one. The internal gears 42 and 44 are of equal pitch diameters and number of teeth, while the internal gear 38 of the winding drum 38 differs in number of teeth from the number of teeth of the gears 42 and 44 by one.

The parts of the mechanism 26 are assembled so that the planetary gear assemblies 36, which are eight in number in the illustrated embodiment (the actual number required will depend upon the application), have their central portions 50 meshing with the sun gear 34 and the winding drum gear 38; the planetary gear side portions 52 mesh with the internal gear 42 while the planetary gear side portions 53 mesh with the internal gear 44.

Further in accordance with the invention, the mechanism 26 is made self locking by having the pitch diameter of the planetary gear central portions 50 about one half or less than the pitch diameter of the sun gear 34. This relationship of parts not only insures self locking characteristics, but also that the wind up drum 26 will rotate in a wind up speed comparable to the wind up speed of conventional hand brakes.

In one specific operational form of the device 10, sun gear 34 has twenty-six teeth, the planetary gear central portions 50 have nine teeth while their side portions have eight teeth, the internal gear 38 has forty-four teeth, and the internal gears 42 and 44 each have forty-three teeth.

Figure 5:
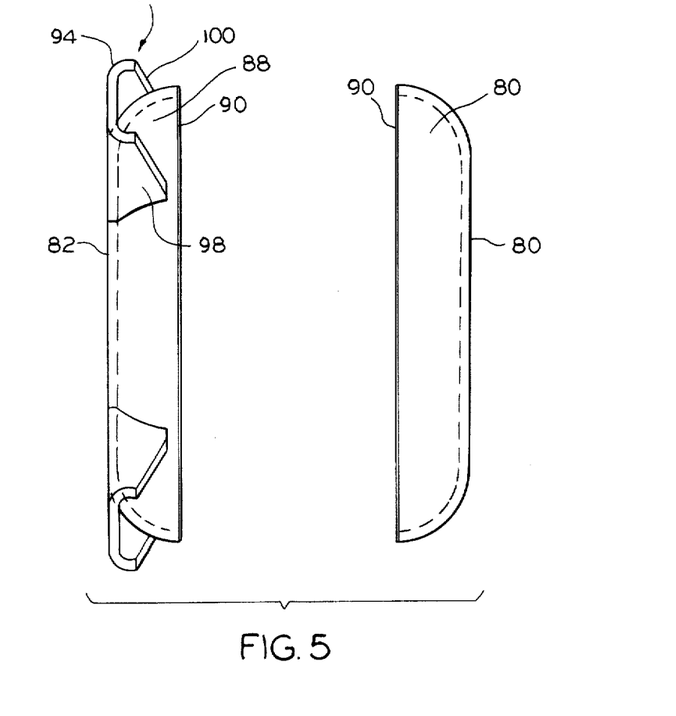
FIG. 5 is a view of the housing back plate of FIG. 4 viewed along line 5—5 of FIG. 4 and shown in spaced association with the front plate of the housing.

The hand brake 10 is preferably proportioned and arranged for suitable brake chain wind up, for instance 26 to 28 inches, which may be accomplished in approximately 315 to 320 degrees of rotational movement of the brake drum 26 clockwise of the position of FIG. 5, with a force in the brake chain 28 of about 6,000 pounds.

Assuming the hand brake 10 is mounted in its usual operating position and the brake chain 28 is suitably connected to the brake rigging in the usual manner, and also is connected to the brake drum as suggested in the drawings, the normal tension in the brake rigging holds the brake drum in the general position shown in FIGS. 1 and 5 in the fully unwound relation.

In operation, the brake chain 28 is wound up on the brake drum 26 by rotating hand wheel 24 clockwise of FIG. 6, which in the embodiment illustrated, rotates brake drum 26 in the opposite direction (although the direction of rotation of drum 26 will depend on whether internal gears 42 and 44 have greater or lesser numbers of teeth (and thus be of greater or less pitch diameter), than the drum gear 38. Where the gears 42 and 44 have less number of teeth than gear 38, drum 26 on rotation of shaft 22 rotates oppositely of shaft 22 (as in the illustrated embodiments), but where the gears 42 and 44 have greater number of teeth than gear 38, drum 26 will rotate in the same direction as shaft 22.

As the hand wheel 24 is rotated, the planetary gear assemblies 36 ride about bearing rings 60 and 62 to orbit about the sun gear 34. The tooth number differential involved in the planetary gear assemblies 36 provides the mechanical advantage that the mechanism 32 works through which enables ready manual wind up of the brake chain on the drum.

It is to be noted that the gear reducer mechanism 32 is arranged so that its sun gear 34 and internal gear 38 are at the center of the reducer, with the drive involved being equally supported and resisted at either side of the sun gear 34 by the fixed internal gears 42 and 44 that mesh with the planetary gear side portions 52 and 53 respectively, and with the planetary gear surfacings 68 and 70 respectively riding on the raceways 72 and 74 of the floating bearing rings 60 and 62. Thus, the forces acting through the gear reducer 32 are balanced on either side of the sun gear for maximum operating efficiency, and furthermore, the planetary gear assemblies 36 freely roll around the raceways 72 and 74 in non-journaled relation to the bearing rings 60 and 62 with minimum friction drag characteristics that insofar as the bearing rings 60 and 62 are concerned are confined to the rolling friction involved. Following conventional gearing principles, the sun gear 34 meshes with the planetary gear portions 50 to dispose their pitch diameters in tangent relation, and similarly the pitch diameter of the respective central portions 50 is in tangent relation to the pitch diameter of the drum internal gear 38. Likewise, the pitch diameters of the respective side gear portions 52 and 53 are in tangent relation with the pitch diameters of the fixed internal gears 42 and 44.

The bearing rings 60 and 62, being free to float somewhat with respect to the operating shaft 22 and housing 12, thus accommodate uniform gear load distribution through mechanism 32. This embodiment is thus preferred. However, the rings 60 and 62 may be journaled on or with respect to shaft 22 or housing 12 as illustrated in FIG. 3 that will be referred to more specifically hereinafter. The mechanical advantage that the gear reducer 32 operates through exerts a significant biasing force on the planetary gear assemblies 36 that acts radially inwardly of the reducer mechanism 32. This inward biasing action of the planetary gear assemblies 36 is effectively resisted by bearing rings 60 and 62 which are made of suitable load bearing material, such as bearing steel, for this purpose.

As indicated, the hand brake 10, contrary to prior practices, operates with an efficiency on the order of 80-85 percent, with the result that the force needed to rotate the shaft 22, will be substantially less than the conventionally assumed 125 pounds, though the specific force involved will depend on the force to be applied on the brake chain.

The wind up of the brake chain 38 continues until the brakes are fully applied as indicated to the operator by the usual "maximum effort" test. The self locking nature of the gear reducer mechanism 32 means that the operator need merely release his grip on the hand wheel whereby the hand brake will then preclude unwinding of the brake chain, so that the brake are thus effectively set. The self locking nature of the hand brake 10 is such that there is no need to latch hand wheel 24 or shaft 22 against rotational movement so long as the brake is to be applied.

When gradual release of the brake is desired, the operator rotates the hand wheel in the opposite direction at the speed he wishes to effect the gradual brake release.

For full release of the brakes, the operator starts the hand wheel 24 rotating in the direction for release, and the forces acting on the gear reducer mechanism 32 through brake chain 26 will act through the mechanism 32 to rotate the operating shaft 22 and hand wheel to unwind the brake chain to fully released position. As the chain reaches full let out, the unwinding stops smoothly. Reversely winding tendencies at this point are precluded by the mechanism 32, and neither fixed stops or shock absorbers are required to limit unwinding movement of the drum or cushion abrupt motion shocks at the full unwind position as the chain full let out position, when approached and reached by the chain, smoothly stops unwinding movement of drum 26 under the controlled release movement governed by mechanism 32.

Figures 11, 12:
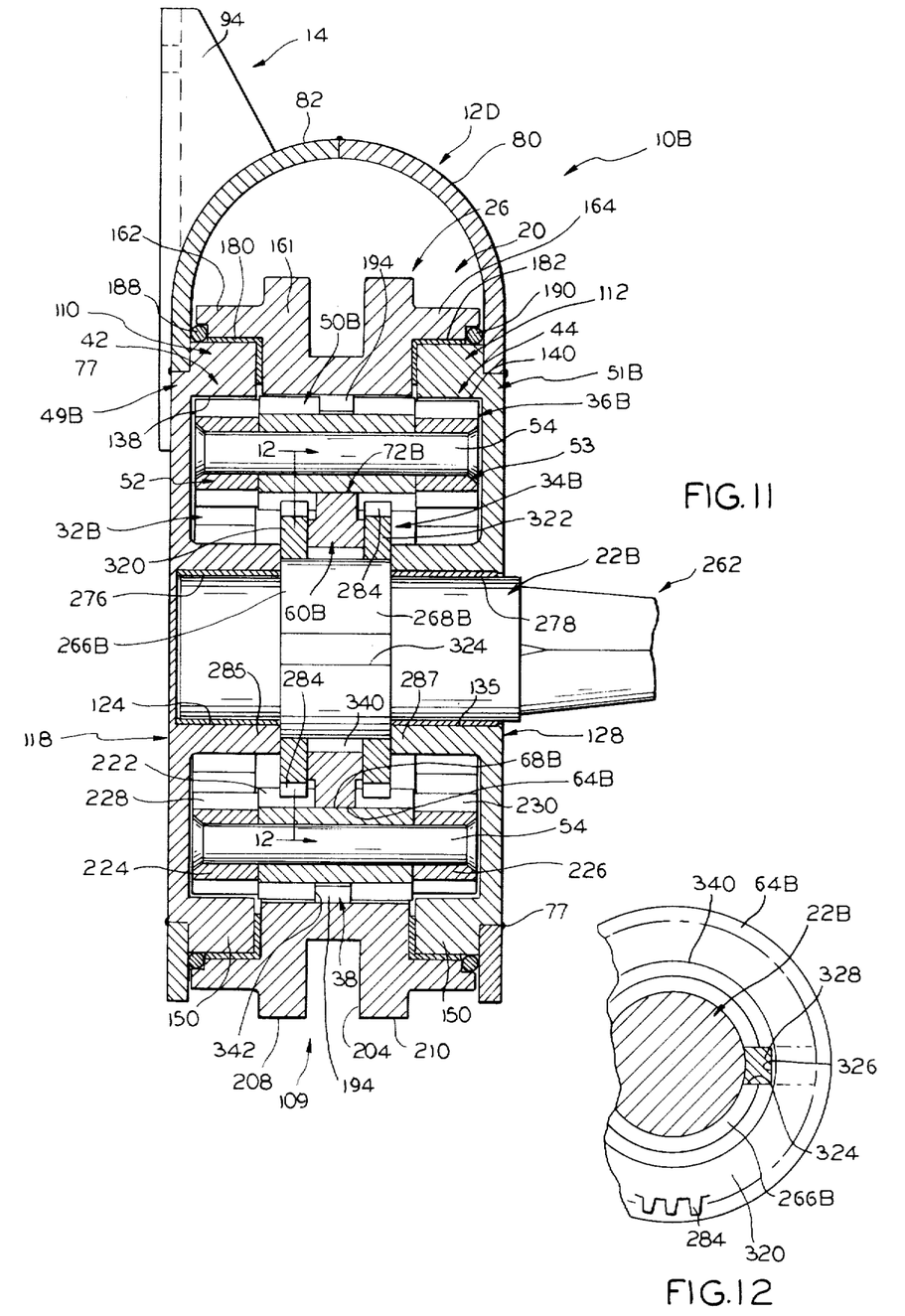
FIG. 11 is a view similar to that of FIG. 2, but illustrating another modified embodiment.
FIG. 12 is a fragmental sectional view along line 12—12 of FIG. 11.

In the hand brake 10B of FIGS. 11 and 12, the planetary gears 36B each are formed in their central portions 50B with a single rolling land surfacing 68B that rides on the bearing land 64B defined by floating bearing ring 60B that is located centrally of sun gear 34B. Combination gear, and plate structures 49B and 51B are fixed to the housing 12B by welding, as at 77. Land 64B forms raceway 72B. Land surfacings 68B are concentric with the respective axes of the respective assemblies 36B.

SPECIFIC DESCRIPTION

Figure 4:
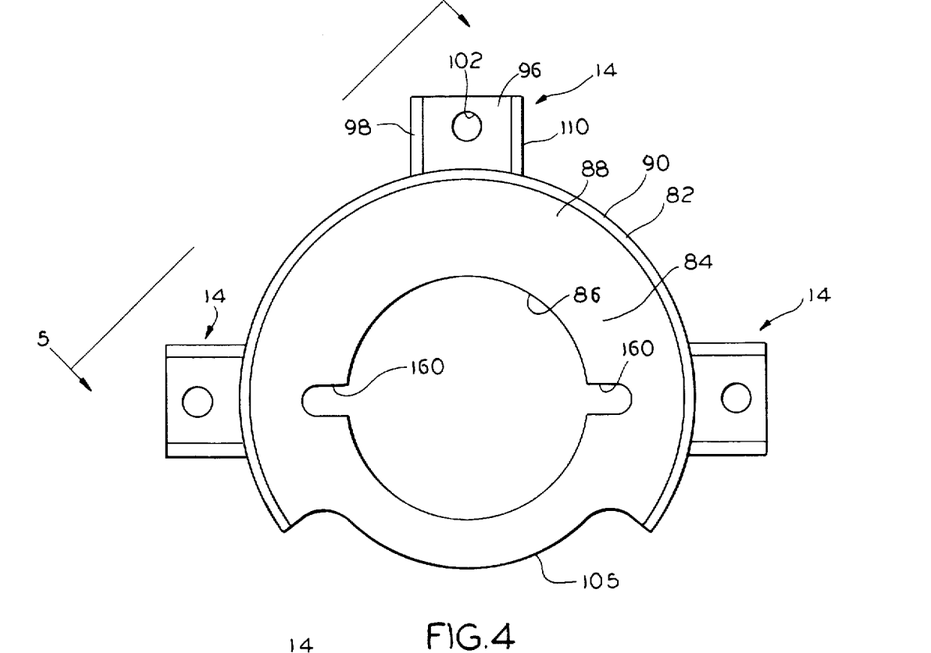
FIG. 4 is a frontal plan view of the hand brake housing back plate forming a part of the housing of the hand brake of this invention.

The housing 12 comprises front housing plate or shell 80 and rear housing plate or shell 82 of similar configuration as illustrated in FIGS. 4 through 6. The plates or shells 80 and 82 are thus of dished configuration defining planar central portions 84 that are formed to define the respective circular bores 86 that are concentric therewith, having arcuate side walls 88 that are joined together at their rims 90 by welding as at 92.

The rear plate or shell 82 has the mounting lugs 14 suitably affixed thereto as by welding in the positioning indicated in FIGS. 1 and 5. The lugs 14 each comprise in the form illustrated a bracket plate 94 shaped to define planar web 96 and a pair of spaced apart reinforcing side walls 98 and 100. The webs 96 are in coplanar relation with the planar portions 84 of the back plates 82, and are formed with suitable bolt holes 102 to receive the bolt assemblies 16 or the like that are to affix the hand brake 10 to the car in its operative position. The plates 80 and 82 are suitably shaped or excised as at 105 and 107, respectively, to provide the hand brake housing 12 with the downwardly opening window opening 109 through which brake chain 28 operates.

In the specific hand brake arrangement illustrated, the winding drum 26 is journaled on and between annular bearing portions in the form of annular bearing plates 110 and 112 that comprise the respective combination plate structures 49 and 51, with the plate 110 being formed to define internal gear 42 and the plate 112 being formed to define the internal gear 44.

In accordance with the illustrated embodiment, the bearing plate 110 is recessed as at 114 (see FIGS. 2 and 7) to receive in press fitted relation thereto the rim 116 of hub structure 118 that is operably associated with the housing back plate or shell 82. Hub structure 118 comprises disc portion 120 that is integral with the rim portion 116 and hub portion 122 that defines bore 124 in which the inner end 126 of shaft 22 is journaled.

Similarly, the bearing plate 112 is similarly operably associated with hub structure 128 that is in turn operatively mounted in the housing front plate or shell 80. Bearing plate 112 is thus recessed at 130 to receive in a press fit manner the rim 132 of the hub structure 128 which includes disc portion 132 that is integral with hub portion 134 defining bore 135 in which the outer end 136 of shaft 22 is journaled.

The bearing plate 110 is suitably formed with gear teeth 138 that define the internal gear 42, while the bearing plate 112 is suitably formed with similar teeth 140 that define the internal gear 44.

The bearing plates 110 and 112 are of annular or ring configuration defining the respective annular portions 150 having cylindrical peripheries 152, and flange portions 154 that are integral with annular portions 150, and which are each formed, as indicated in FIG. 7, with a pair of suitable recesses or sockets 156 to receive in press fit relation thereto the respective anchor pins 158 that, in the assembled relation of the hand brake, are received in the respective slots 160 formed in the housing front and back plates 80 and 82 to anchor the bearing plates 110 and 112 against rotational or pivotal movement relative to housing 12.

In the preferred way of making the hand brake 10, the separately formed bearing plates 110 and 112 and the separately formed hub structures 118 and 128 are assembled in the manner suggested in FIGS. 1 and 2 to form subassemblies, with the rim 116 of the hub structure 118 being press fitted into the recess 114 of the bearing plate 110, and the rim portion 132 of the hub structure 128 being press fitted into the recess 130 of the bearing plate 112. As indicated in FIGS. 1 and 2, the disc portion 120 of hub structure 118 is press fitted in bore 86 of housing plate 80 while the disc portion 132 of the hub structure 128 is press fitted within the bore 86 of housing plate 80. Preferably the parts are proportioned for leak free press fitting connection of the respective disc portions 118 and 132 within the respective bores 86.

The winding drum 26 generally comprises annular member 161 having laterally extending flange portions 162 and 164 that are received over the respective annular portions 150 of the respective bearing plates 110 and 112. In the form shown, the angular bearing rings 180 and 182, formed from a suitable self lubricating material such as Teflon, are interposed between the annular member 161 and the respective bearing plate annular portions 150. Annular member 161 at its flanges 162 and 164 is recessed as at 184 and 186, respectively, to receive the respective sealing O ring seals 188 and 190.

Seals 188 and 190 function to completely seal off the gear reducer mechanism 32, whereby mechanism is totally enclosed thereabout for protection from the elements; the housing is open to the atmosphere about the drum 26, however, to accommodate chain 28.

Annular member 161 is suitably formed about its inner margin 40 to define the teeth 194 of internal gear 38.

The central portion 200 of the drum annular member 161 about its periphery is formed to define the drum chain winding surfacing or drum portion 202 thereabout, thus the drum central portion 200 is recessed as at 204 about its periphery 202 to receive alternate links 206 of the brake chain, with the drum being formed with cylindrical lands 208 and 210 on either side of the recess 204 on which other alternate chain links 206 may lie when the chain is wound up on the drum, as indicated in FIGS. 1 and 2.

As indicated in FIG. 1, the brake chain 30 is suitably attached to the drum 26, as by having its end link 206 anchored to the spaced apart securement lugs 212 and 214 suitably secured thereto (as by welding), by way of suitable pin 216 suitably fitted in the mounting plates 212 and 214 in accordance with conventional practice.

The planetary gear assemblies 36 in the specific form illustrated comprise the body 220 (see FIG. 8) that is shaped to define the central gear portion 50 including its teeth 222, and separate bodies 224 and 226 that are also respectively formed to define the planetary side gear portions 52 and 53 respectively including their respective gear teeth 228 and 230. As already indicated, the bodies 220, 228 and 230 are secured together by a suitable rivet 54 and copper brazing or the like where indicated at 56 and 58. Of course, the teeth 228 and 230 of the respective gear side portions 52 and 53 should be aligned longitudinally of the respective planetary gear assemblies 36, as bearing plates 110 and 112 are similarly positioned to similarly align their teeth 138 and 142 axially of shaft 22.

In the preferred embodiment of the invention, the surfacings 68 and 70 of the gear side portions 52 and 53 are in the form of end notchings 232 formed in the respective teeth 228 and 230 to form a relatively short tooth portions 234 that are to ride on the bearing rings 60 and 62. This arrangement, plus the substantial radially inward bias that is acting on the planetary gear assemblies 36 when the gear reducer mechanism 32 is resisting loads, provides substantial resistance to tendencies to backward movement of the planetary gear assemblies that might be induced by vibration.

Figure 10:
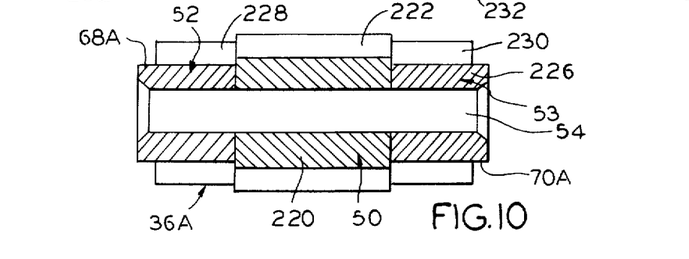
FIG. 10 is a view similar to that of FIG. 8 illustrating a modified planetary gear assembly arranged in accordance with the present invention.

In the modified form of FIG. 10, the corresponding surfacings 68A and 70A of planetary gear assemblies 36A are cylindrical in configuration for rolling engagement with the respective raceways 72 and 74. The embodiment of FIG. 10 is otherwise the same as that of FIG. 8 insofar as the planetary gear assemblies 36 are concerned.

The bearing rings 60 and 62 are identical in configuration, and thus form the rings 240 defining an inner marginal surface 242 that is relieved as at 244, and peripheries 246 that are formed to define the recesses 64 that form the respective raceways 72 and 74. Peripheries 246 thus are formed with the respective radial flanges 248 that serve to limit movement of the planetary gear assemblies 36 axially of shaft 22. The parts are proportioned so that the rings 240 in the mounted position of the bearings 60 and 62 are in juxtaposed relation to, but are not compressed against, the disc portions 120 and 132 of the respective hub structures 118 and 128. Rings 240 freely rotate under the rolling friction of the planetary gear assemblies riding on them.

As indicated in FIG. 3, the bearings 60 and 62 may be journaled on the hub structures 118 and 128 or even on the shaft 22 as desired. In the specific showing of FIG. 3, the bearings 60A and 62A are journaled on the hub portions 122 and 134 of the respective hub structure 118 and 128.

Alternately, the raceways 72 and 74 may be defined by radial flanges integral with either the respective hub portions 124 and 134, or shaft 22, on which similar flanges integral with the respective planetary gear assemblies ride, as disclosed in my application Ser. No. 881,619, filed Feb. 27, 1978 (the disclosure of which is incorporated herein by this reference). In such case, the lands defining the indicated raceways 72 and 74 should have diameters equivalent to the pitch diameter of sun gear 34, and the indicated flanges of the planetary gear assemblies should define cylindrical lands for riding on the indicated raceways 72 and 74 having diameters equivalent to the pitch diameter of planetary gear portion 50, as disclosed in said application.

The operating shaft 22 in the specific form illustrated comprises journaling portion 260 that is received within the housing 12, and handle portion 262 to which the hand wheel 24 or other suitable turning or cranking implement is applied in any convenient conventional manner.

The shaft journaling portion 260 comprises the inner end 126 and the outer end 136 of the shaft that are of generally cylindrical configuration, and that are separated by cylindrical ridge 266 defining cylindrical land 268 on which the sun gear 34 is mounted. The shaft portion 260 is formed with a cross bore 270 that extends in the plane of the ridge 266 to receive cross pin 272 that has its ends sufficiently projecting beyond the surface 268 thereof to lie in the diametrically opposed slots 274 of sun gear 34 (one of which is shown in FIG. 2A) to key the sun gear 34 to shaft 22 for rotation therewith.

The ends 126 and 136 of the shaft portion 160 preferably are journaled in suitable sleeve type bearings 276 and 278, formed from a suitable self lubricating material such as Teflon, that are in turn received within the hub portions 122 and 134, respectively.

The sun gear 34 comprises annular body 280 having its inner margin 282 formed to defin the indicated opposed keying slots 274, and its outer periphery 282 formed to define suitable gear teeth 284 that mesh with the central gear portions 50 of the planetary gear assemblies 36. Sun gear 34 is lodged between the respective hub portions 122 and 134 and thus is maintained in centered relation relative to planetary gear assemblies 36;

while the inner ends 285 and 287 of hub portions 122 and 134 are juxtaposed with sun gear 34, free movement of gear 34 relative thereto is provided for so that gear 34 may freely rotate with shaft 22.

Handle portion 262 of shaft 22 includes the usual section 290 of polygonal transverse section and tapered to receive the conventional hand wheel 24 that in the form shown is held in place by nut 292 applied to the shaft threaded stud portion 296 against lock washer 294 bearing against hand wheel hub 298 that has a bore 300 shaped to complement the shaft section 290.

It will thus be seen that the components involved in hand brake 10 make for ready assembly of same. Thus, subassemblies 302 and 304 may be initially formed uniting the bearing plates 110 and 112 their respective hub structures 118 and 128 by utilizing suitable press fitting techniques. Then these subassemblies 302 and 304, which are interchangeable, may be applied to the respective housing plates 80 and 82, again by employing suitable press fitting techniques to fit the respective hub structures 118 and 128 within the respective ousing 80 and 82 in the manner indicated in FIGS. 1 and 2.

This now provides a housing front plate subassembly 306 and a housing back plate subassembly 308. The hand brake may be further assembled by laying the housing back plate subassembly 308 open side upward on a work table or the like, and applying bearing ring 60 against hub structure 118 (as shown in FIG. 2), and the bearing 124 and shaft portion 160 of shaft 22 to hub portion 122, after which gear 34 may be applied to shaft portion 260, by slipping it over shaft ridge 266 and resting it on hub end portion 285 (after pin 272 has been applied to its bore 270).

After the O ring 188 and angular bearing 180 have been applied to bearing plate 110, the individual preassembled planetary gear assemblies 36 may be inserted in suitable spaced relation within internal gear 42 and in proper relation with raceway 72, and then the brake drum 26 lowered onto its operative position with respective to the bearing plate 110 and against seal 188 and bearing 180, with the teeth 194 of internal gear 38 appropriately meshing with the teeth 222 of the central portions 50 of the planetary gear assemblies 36.

The assembler now may apply the O ring 186 and bearing 182 to bearing plate 112 of the previously formed front plate assembly 306, and also appropriately position bearing sleeve 278 within hub portion 134 and bearing ring 62 in proper relation to the planetary gear assemblies, after which the front plate subassembly 306 may now be lowered against the back plate subassembly 308 to position the parts as illustrated in FIGS. 1 and 2, with the planetary gear portions 53 in suitable meshing relation with the teeth 142 of internal gear 44.

The front and back plates 80 and 82 may then be appropriately welded where indicated at 92 thereabout to fix the housing and its component parts in assembled relation.

In use, the hand brake 10 has hand wheel 24 of a conventional arrangement suitably applied to the polygonal section 290 of the shaft handle portion 262, as previously described. Chain 28 has its end 30 secured to drum 26 and its other end to the rigging, in accordance with standard practices.

It will therefore be seen that the invention provides a hand brake arrangement characterized by high leverage, relatively small size, lightness in weight, operating to provide its leverage through a gear reducer mechanism that is free of clutches or the like, and that is fully self locking while yet providing for adequate brake chain wind up and let out feed rates.

The special organization of the gear reducer components of the hand brake in providing for free rolling movement of the planetary gear assemblies 36 about raceways 72 and 74 in non-journaled relation thereto greatly reduces friction drag. Further, since the drive involved is equally supported and resisted at either side of the sun gear by the fixed internal gears meshing with the planetary gear side portions, there is a balancing of the forces acting in the mechanism that, together wth the indicated journaling of the planetary gear assemblies, avoids force wasting misalignment problems. These factors are major reasons why the hand brake of this invention may operate at an efficiency on the order of 80-85 percent.

The wind up drum 26 is journaled on large diameter bearings of significant load support surfacing thereby minimizing stress concentrations as a result of the loads imposed on the wnd up drum 26. The drum is actuated by a central drive input and output, with the internal gears 42 and 44 and the bearing plates 110 and 112 in which they are formed effecting balanced internal force characteristics of the planetary gear assemblies 36 that ride around the circular raceways 72 and 74 in a free rolling unimpeded manner. The particular arrangement of the planetary gear assemblies as associated with bearing rings 60 and 62, and the manner in which sun gear 34 is mounted in operating position, function to maintain the desired centered relation of these important components of mechanism 32.

In a specific embodiment of the invention, the housing 12 is 11⅛ inches in maximum diameter with the wind up drum 26 having a diameter of 8½ inches. The internal gear 38 has a pitch diameter of 5½ inches while the internal gears 42 and 44 have a pitch diameter of 5⅜ths inches.

In the planetary gear assemblies 36, the central portions 50 have a pitch diameter 1⅛th inch while the side portions have a pitch diameter of 1 inch. Sun gear 34 has a pitch diameter of 3⅛th inch. Raceways 72 and 74 each have a diameter of 3.437 inch, while surfacings 68 and 70 have a diameter of 7/8ths inch at the tops of short tooth portions 234.

The circular peripheries 152 of bearing plates 110 and 112 are 6¾ inch in diameter, while the diameter of shaft portion 260 apart from ridge 266 is 1.65 inch, which is indicative of the relatively large nature of the journals on which the drum 26 operates.

The hand brake 10B is also a preferred arrangement, in which sun gear 34B comprises gear rings 320 and 322 that are applied to operating shaft ridge 266B defining cylindrical land 268B on which rings 320 and 322 are mounted in spaced apart relation, between hub portion ends 285 and 287, to receive bearing ring 60B. Ridge 266B and rings 320 and 322 are slotted as at 324 and 326 to receive key 328 (see FIG. 12) for keying rings 320 and 322 to shaft 22B. The bore 340 of bearing ring 60B is proportioned to be free of key 328 and permit radial floating of ring 60B relative to shaft 22B, similar to rings 60 and 62 of device 10. The central portion 50B of the planetary gear assemblies 36B is formed to define central recess or slot 342, about which surfacings 68B are formed, to receive land 64B of bearing ring 60B.

In the hand brake 10B, the housing slots 160 and keying pins 158 are eliminated, with combination plate structure 49B and 51B being fixed to housing 12B as by welding at 77 (as already indicated). Hand brake 10B is otherwise the same as hand brake 10, as indicated by corresponding reference numerals. Assembly of brake 10B is similar except that prior to application of front plate assembly 306, sun gear ring 320, bearing ring 60B, and sun gear ring 322 are consecutively applied to shaft ridge 266B, with key 328 being held in place by hub end portions 285 and 287 in the assembled condition.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. In a hand brake for railroad cars including a housing adapted to be mounted on a car, an operating shaft journalled in said housing for rotation about an axis extending longitudinally of said shaft, a winding drum journalled in said housing for rotational movement about said axis and including means for connecting a brake chain thereto for being wound up thereby, and means for coupling said operating shaft to said winding drum for rotating said winding drum about said shaft axis with a mechanical advantage to wind up the brake chain, the improvement including:

a pair of fixed internal gears mounted in said housing in fixed relation to said housing and coaxial with said axis,
   said internal gears having equivalent pitch diameters and being spaced apart longitudinally of said axis,
   said winding drum defining an annular gear interposed between said internal gears that is coaxial with said shaft axis,
   a sun gear fixed to said shaft for rotation therewith about said axis with said sun gear being coaxial with said axis,
   one or more planetary gear assemblies mounted in said housing for orbiting movement about said axis,
   said planetary gear assemblies each comprising:
   a central pinion gear portion meshing with said sun gear and said winding drum gear,
   and a pair of side pinion gear portions disposed one on either side of said central gear portion,
   said side gear portions respectively meshing with the respective fixed internal gears,
   said fixed internal gears having the same number of teeth,
   said gears comprising said coupling means,
   said side gear portions of the respective planetary gear assemblies each having the same number of teeth, which number is different from the number of teeth of said central gear portion,
   said winding drum being journalled on and between said internal gears on bearing surfaces defined thereby having diameters that exceed the pitch diameters of said internal gears and said annular gear.

2. The improvement set forth in claim 1 wherein:
   the pitch diameter of said planetary gear assembly central gear portions is no more than about one half the pitch diameter of said sun gear, whereby said coupling means is self locking.

3. In a hand brake for railroad cars including a housing adapted to be mounted on a car, an operating shaft journalled in said housing for rotation about an axis extending longitudinally of said shaft, a winding drum journalled in said housing for rotational movement about said axis and including means for connecting a brake chain thereto for being wound up thereby, and means for coupling said operating shaft to said winding drum for rotating said winding drum about said shaft axis with a mechanical advantage to wind up the brake chain, the improvement comprising:

a pair of annular bearing plates fixed to said housing in coaxial relation to said axis and one on either side of the housing,
   said winding drum being journaled on and between said bearing plates and defining an annular gear within same that is coaxial with said axis,
   said bearing plates each defining an internal gear coaxial with said axis,
   a sun gear keyed to said shaft for rotation therewith, with said sun gear being coaxial with said axis,
   a plurality of planetary gear assemblies disposed in said housing between said sun gear and said annular gear,
   said planetary gear assemblies each comprising:
   a central pinion gear portion meshing with said annular gear and a pair of side pinion gear portions disposed one on either side of said central gear portion and respectively meshing with the respective internal gears,
   and circular raceway surface means disposed about said axis in substantial concentric relation thereto on which said planetary gear assemblies ride for free rolling non-journalled orbiting movement about said sun gear,
   said gears comprising said coupling means.

4. The improvement set forth in claim 3 wherein:
   said circular raceway surface means is in the form of a pair of circular lands disposed one on either side of said sun gear, with said planetary gear assemblies rolling on said lands on rotation of said coupling means about said axis.

5. The improvement set forth in claim 4 including:
   means for restraining said lands against any substantial movement longitudinally of said axis.

6. The improvement set forth in claim 4 wherein:
   said lands are equally spaced from said sun gear,
   and said planetary gear assembly side portions each include segments that ride on the respective lands.

7. The improvement set forth in claim 6 wherein:
   said planetary gear side portion segments are cylindrical in external configuration.

8. The improvement set forth in claim 6 wherein:
   said planetary gear side portion segments comprise extensions of the pinion gear toothed configuration thereof of fragmental but equal tooth height.

9. The improvement set forth in claim 6 wherein:
   said internal gears are of equal pitch diameter and number of teeth,
   with said planetary gear assembly side gear portions being of equal pitch diameter and number of teeth,
   and with said planetary gear assembly central portions being of equal pitch diameters and numbers of teeth,
   said number of teeth of the planetary gear center portions differing from the number of teeth of said side portions thereof,
   and said number of teeth of said internal gears differing from the number of teeth of said annular gear.

10. The improvement set forth in claim 9 wherein:
    the pitch diameter of said planetary gear assembly central portions is no more than about one half the pitch diameter of said sun gear.

11. The improvement set forth in claim 3 wherein:
said housing comprises:
a pair of dished plates joined together at their rims,
said plates each defining a bore concentric with said axis,
said plates each having a hub fixed in the bore thereof in which said operating shaft is journalled,
said bearing plates being seated on the respective hubs on either side of said housing.

12. The improvement set forth in claim 11 wherein:
said sun gear is centered between said hubs.

13. The improvement set forth in claim 3 including:
means for sealing off said coupling means comprising annular seal means interposed between said bearing plates and said winding drum for enclosing said coupling means within said housing.

14. The improvement set forth in claim 3 wherein:
said circular raceway surface means is in the form of a circular land disposed centrally of said sun gear, with said planetary gear assemblies rolling on said land on rotation of said coupling means about said axis.

15. The improvement set forth in claim 14 wherein:
said planetary gear assembly central portions each include a land portion that rides on said raceway surface means land.

16. In a wind up arrangement for hand brakes for railroad cars, including a housing adapted to be mounted on a car, an operating shaft journalled in said housing for rotation about an axis extending longitudinally of said shaft, a winding drum journalled in said housing for rotational movement about said axis and including means for connecting a brake chain thereto for being wound up thereby, and means for coupling said operating shaft to said winding drum for rotating said winding drum about said shaft axis with a mechanical advantage to wind up the brake chain, the improvement comprising:
a pair of annular bearing portions fixed with respect to said housing in coaxial relation to said axis and one on either side of the housing,
said winding drum being journalled on and between said bearing portions and defining an annular gear within same that is coaxial with said axis,
said bearing portions each defining an internal gear coaxial with said axis and providing a bearing surface coaxial with said axis on and between which said winding drum is journalled,
said bearing surfaces being of an equal diameter that has a dimension that exceeds the pitch diameters of said internal gears,
a sun gear keyed to said shaft for rotation therewith, with said sun gear being coaxial with said axis,
a plurality of planetary gear assemblies disposed in said housing between said sun gear and said annular gear,
said planetary gear assemblies each comprising:
a central pinion gear portion meshing with said annular gear and a pair of side pinion gear portions disposed one on either side of said central gear portion and respectively meshing with the respective internal gears,
and circular raceway surface means disposed about said axis in substantial concentric relation thereto on which said planetary gear assemblies ride for free rolling non-journalled orbiting movement about said sun gear,
said gears comprising said coupling means.

17. The improvement set forth in claim 16 wherein:
the pitch diameter of said planetary gear assembly central portions is no more than about one half the pitch diameter of said sun gear.

* * * * *